US009376599B2

(12) United States Patent
Welke et al.

(10) Patent No.: US 9,376,599 B2
(45) Date of Patent: Jun. 28, 2016

(54) ADHESIVE ARTICLE COMPRISING AN ACRYLIC FOAM LAYER

(75) Inventors: Siegfried K. Welke, Erkrath (DE); Volker Paschmann, Essen (DE)

(73) Assignee: 3M Innovative Properties Company, St. Paul, MN (US)

( * ) Notice: Subject to any disclaimer, the term of this patent is extended or adjusted under 35 U.S.C. 154(b) by 115 days.

(21) Appl. No.: 13/203,839

(22) PCT Filed: Feb. 23, 2010

(86) PCT No.: PCT/US2010/025045
§ 371 (c)(1),
(2), (4) Date: Aug. 30, 2011

(87) PCT Pub. No.: WO2010/101738
PCT Pub. Date: Sep. 10, 2010

(65) Prior Publication Data
US 2011/0315316 A1 Dec. 29, 2011

(30) Foreign Application Priority Data

Mar. 5, 2009 (EP) .................................... 09154408

(51) Int. Cl.
B32B 37/12 (2006.01)
C09J 7/02 (2006.01)
C08F 220/18 (2006.01)
C08J 3/28 (2006.01)
C08F 220/06 (2006.01)

(52) U.S. Cl.
CPC ............. *C09J 7/0289* (2013.01); *C08F 220/18* (2013.01); *C08J 3/28* (2013.01); *C09J 7/0214* (2013.01); *C09J 7/0221* (2013.01); *C08F 220/06* (2013.01); *C08F 2220/1825* (2013.01); *C08J 2309/00* (2013.01); *C09J 2409/00* (2013.01); *C09J 2433/00* (2013.01); *C09J 2433/006* (2013.01); *C09J 2453/00* (2013.01); *Y10T 428/249983* (2015.04)

(58) Field of Classification Search
CPC ........ B32B 7/12; B32B 9/046; B32B 25/045; C09J 7/0214; C09J 115/00; C09J 121/00

USPC .............. 156/327; 427/208, 208.4; 428/317.3
See application file for complete search history.

(56) References Cited

U.S. PATENT DOCUMENTS

| 4,181,752 A | 1/1980 | Martens et al. |
| 4,223,067 A | 9/1980 | Levens |
| 4,303,485 A | 12/1981 | Levens |
| 4,415,615 A | 11/1983 | Esmay et al. |
| 4,619,979 A | 10/1986 | Kotnour et al. |
| 4,833,179 A | 5/1989 | Young et al. |
| 4,843,134 A | 6/1989 | Kotnour et al. |
| 5,296,547 A | 3/1994 | Nestegard et al. |
| 5,382,451 A | 1/1995 | Johnson et al. |
| 5,393,373 A | 2/1995 | Jun et al. |
| 5,637,646 A | 6/1997 | Ellis |
| 5,804,610 A | 9/1998 | Hamer et al. |
| 6,204,350 B1 | 3/2001 | Liu et al. |
| 6,780,484 B2 | 8/2004 | Kobe et al. |
| 6,805,933 B2 | 10/2004 | Patel et al. |
| 6,835,422 B2 | 12/2004 | Kobe et al. |

FOREIGN PATENT DOCUMENTS

| WO | WO 00-06637 | 2/2000 |
| WO | WO 02-04200 | 1/2002 |
| WO | WO 2008-070386 | 6/2008 |
| WO | WO 2008/073669 | 6/2008 |

OTHER PUBLICATIONS

International Search Report for PCT Application No. PCT/US2010/025045, Date of Mailing May 4, 2010, 3 pages.
Written Opinion for PCT Application No. PCT/US2010/025045, May 2010, 5 pages.

*Primary Examiner* — Timothy Kennedy
(74) *Attorney, Agent, or Firm* — Dena M. Ehrich; Philip Y. Dahl

(57) ABSTRACT

The present disclosure provides an adhesive article comprising a foam layer having first and second major sides and a pressure sensitive adhesive layer associated with at least one of the major sides for the foam layer, said pressure sensitive adhesive layer comprising a cross-linked rubber and wherein the foam layer comprises an acrylic polymer obtainable by polymerization a polymerizable composition comprising one or more alkyl acrylates having an average of 3 to 14 carbon atoms in the alkyl groups, one or more polar monomers and one or more multi-functional monomers having at least two free radical polymerizable groups.

12 Claims, No Drawings

ADHESIVE ARTICLE COMPRISING AN ACRYLIC FOAM LAYER

CROSS REFERENCE TO RELATED APPLICATIONS

This application is a national stage filing under 35 U.S.C. 371 of PCT/US2010/025045, filed Feb. 23, 2010, which claims priority to EP Application No. 09154408.0, filed Mar. 5, 2009, the disclosure of which is incorporated by reference in its/their entirety herein.

FIELD

The present disclosure relates to an adhesive article comprising an acrylic foam layer and a pressure sensitive adhesive layer that comprises a cross-linked rubber. The disclosure further relates to making the adhesive article and use thereof.

BACKGROUND

Adhesives and tapes are commonly used to bond two substrates together to form a bonded composite. Particular adhesive tapes include those that have a foam layer. Such tapes or adhesive articles are used for example in the automotive industry where they may be employed to bond various components to the body of a car or other motor vehicle. Typically they are used to bond such parts as emblems, plastic parts as well as rubber gaskets to doors.

Examples of adhesive tapes are disclosed in for example WO 2008/070386, U.S. Pat. No. 6,503,621 and U.S. Pat. No. 4,415,615.

While a vast array of adhesives and tapes are available, advances in substrates and end use requirements continues to drive a need for new adhesive formulations and tape constructions. For example, developments in paints and coatings on automotive parts to which the adhesive tapes are to be bonded have proven to be particularly challenging. Typically, these coatings and paints have low surface energy, requiring the development of special adhesive tapes. Likewise, there is a continuing trend in the transportation sector and in particular in the automotive industry to further reduce weight of for example cars in order to save on fuel consumption. This trend is leading to use and application of adhesive tapes where they have previously not been used or to the application of tapes in new configurations that are more demanding for example in stress-strain to which the adhesive tape may be subjected. In addition to performance properties, environmental regulations and processing costs also influence product formulation requirements.

It would thus be desirable to find further adhesive articles that have one or more improved performance properties. For example, it would be desirable to find an adhesive article that has improved adhesive performance in adhering to low energy surfaces such as for example paint and coating surfaces of automotive parts. It would furthermore be desirable to find adhesive articles that can be readily manufactured in an economical and cost effective way. Yet further, it would be desirable to find adhesive articles that have good environmental properties. Also, adhesive articles that are compatible with existing manufacturing methods that employ adhesive articles would be desirable.

SUMMARY

In one aspect, the present disclosure provides an adhesive article comprising a foam layer having first and second major sides and a pressure sensitive adhesive layer associated with at least one of the major sides for the foam layer, said pressure sensitive adhesive layer comprising a cross-linked rubber and wherein the foam layer comprises an acrylic polymer obtainable by polymerization a polymerizable composition comprising one or more alkyl acrylates having an average of 3 to 14 carbon atoms in the alkyl groups, one or more polar monomers and one or more multi-functional monomers having at least two free radical polymerizable groups.

The term "associated with" as used in connection with the present disclosure means that the relevant layer is provided directly on the surface or indirectly through the intermediary of one or more layers such as primer layers for example.

It has been found that that the adhesive articles show good to excellent adhesive performance. For example, they may provide good or excellent adhesive performance to low energy surface, including good 90° peel adhesion performance as well as performance under static and dynamic shear testing.

In a further aspect of the present disclosure, there is provided a method of making the adhesive article comprising:
(i) making a foam layer having first and second major sides by (a) providing a polymerizable composition comprising one or more alkyl acrylates having an average of 3 to 14 carbon atoms in the alkyl groups, one or more polar monomers and one or more multi-functional monomers having at least two free radical polymerizable groups, (b) frothing said polymerizable composition and (c) polymerizing said polymerizable composition;
(ii) applying a pressure sensitive adhesive composition comprising a cross-linkable rubber on one or both of said first and second major sides of said foam layer so as to form a pressure sensitive adhesive layer; and
(iii) cross-linking said cross-linkable rubber.

DETAILED DESCRIPTION

In yet a further aspect, the present disclosure provides a use of the adhesive article comprising adhering the adhesive article to a substrate through said pressure sensitive adhesive layer.

Particular embodiments of the present disclosure are summarized as follows:
1. Adhesive article comprising a foam layer having first and second major sides and a pressure sensitive adhesive layer associated with at least one of the major sides for the foam layer, said pressure sensitive adhesive layer comprising a cross-linked rubber and wherein the foam layer comprises an acrylic polymer obtainable by polymerization a polymerizable composition comprising one or more alkyl acrylates having an average of 3 to 14 carbon atoms in the alkyl groups, one or more polar monomers and one or more multi-functional monomers having at least two free radical polymerizable groups.
2. Adhesive article according to embodiment 1 wherein said polymerizable composition comprises 83 to 97% by weight of said alkyl acrylates, 3 to 16% by weight of said polar monomers and 0.01 to 1% by weight of said multi-functional monomers.
3. Adhesive article according to embodiment 1 or 2 wherein said foam layer further comprises a thixotropic agent.
4. Adhesive article according to embodiment 3 wherein said thixotropic agent comprises fumed silica.
5. Adhesive article according to any of the previous embodiments wherein said foam layer comprises a frothed foam.

6. Adhesive article according to any of the previous embodiments wherein said pressure sensitive adhesive layer comprises an acrylic pressure sensitive adhesive component.
7. Adhesive article according to embodiment 6 wherein said acrylic pressure sensitive adhesive component comprises an acrylic polymer having repeating units derived from one or more alkyl acrylates having 3 to 14 carbon atoms in the alkyl group and one or more polar monomers.
8. Adhesive article according to any of the previous embodiments wherein said polar monomers are selected from the group consisting of acrylic acids, itaconic acid, acrylamides, acrylonitrile, N-vinylpyrrolidone, N-vinyl caprolactam and combinations thereof
9. Adhesive article according to any of the previous embodiments wherein cross-linked rubber comprises a cross-linked block copolymer having a rubbery block and a glassy block.
10. Adhesive article according to embodiment 9 wherein said rubbery block comprises a first polymerized conjugated diene, a hydrogenated derivative thereof, or combinations thereof and wherein said glassy block comprises a monovinyl aromatic monomer.
11. Adhesive article according to embodiment 9 or 10 wherein said pressure sensitive adhesive layer comprises 30 to 50 parts by weight based on the total weight of the pressure sensitive adhesive layer, of said block copolymer and from 0.1 to 10 parts by weight based on the total weight of the pressure sensitive adhesive layer, of said acrylic pressure sensitive adhesive component.
12. Adhesive article according to embodiment 9 or 10 wherein said pressure sensitive adhesive layer comprises 10 to 20 parts by weight based on the total weight of the pressure sensitive adhesive layer, of said block copolymer and from 40 to 60 parts by weight based on the total weight of the pressure sensitive adhesive layer, of said acrylic pressure sensitive adhesive component.
13. Adhesive article according to any of the previous embodiments wherein each of said first and second major side of said adhesive article have associated with them said pressure sensitive adhesive layer.
14. Adhesive article according to any of embodiments 1 to 12 wherein said adhesive article has said pressure sensitive adhesive layer associated with said first major side and wherein said second major side does not have an adhesive layer associated with it.
15. Adhesive article according to any of embodiments 1 to 12 wherein said adhesive article has said pressure sensitive adhesive layer associated with said first major side and wherein said second major side has a further adhesive layer associated with it.
16. Adhesive article according to embodiment 13 wherein said further adhesive layer comprises a pressure sensitive adhesive component or a heat activatable adhesive component.
17. Adhesive article according to any of the previous embodiments wherein the thickness of said foam layer is between 0.3 mm and 2 mm and wherein the weight per area of said pressure sensitive adhesive layer is between 40 $g/m^2$ and 100 $g/m^2$.
18. Method of making an adhesive article as embodimented in any of embodiments 1 to 17 comprising:
    (i) making a foam layer having first and second major sides by (a) providing a polymerizable composition comprising one or more alkyl acrylates having an average of 3 to 14 carbon atoms in the alkyl groups, one or more polar monomers and one or more multi-functional monomers having at least two free radical polymerizable groups,
    (b) frothing said polymerizable composition and (c) polymerizing said polymerizable composition;
    (ii) applying a pressure sensitive adhesive composition comprising a cross-linkable rubber on one or both of said first and second major sides of said foam layer so as to form a pressure sensitive adhesive layer; and
    (iii) cross-linking said cross-linkable rubber.
19. Method according to embodiment 18 wherein said cross-linking comprises exposing said cross-linkable rubber to e-beam radiation.
20. Method according to embodiment 19 wherein said pressure sensitive adhesive composition is provided directly onto said foam layer and wherein said e-beam is focused at or in the proximity of an interface defined between said foam layer and said pressure sensitive adhesive composition.
21. Method according to any of embodiments 18 to 20 wherein said polymerizable composition comprises a UV-photosensitive initiator and wherein said polymerizable composition is exposed to UV-light.
22. Method according to any of embodiments 18 to 21 wherein said frothing is carried out prior to or simultaneous with said polymerization.
23. Method according to any of embodiments 18 to 22 wherein said frothing is carried out by whipping the polymerizable composition with an inert gas.
24. Use of an adhesive article according to any of embodiments 1 to 17 comprising adhering said adhesive article to a substrate through said pressure sensitive adhesive layer.
25. Use of an adhesive article according to embodiment 24 wherein said substrate has a surface having a surface energy of less than 45 dynes/cm and said adhesive article is adhered to said surface through said pressure sensitive adhesive layer.
26. Use of an adhesive article according to any of embodiments 24 or 25 wherein said adhesive article comprises a further adhesive layer on a major side opposite to the side comprising the pressure sensitive adhesive layer and wherein said adhesive article is adhered to a rubber gasket through said further adhesive layer.

DEFINITIONS

In the disclosure of the present application the following terms are defined as follows unless otherwise indicated:
"acrylic" is used to identify both acrylic as well as methacrylic monomers and polymers.
"mono-functional monomer" means a monomer having only one polymerizable group.
"multi-functional monomer" means a monomer having two or more polymerizable groups.
Any ranges identified in the present application are to be understood as including the end points unless expressly stated otherwise.
The term "pressure sensitive adhesive" is used to indicate materials that materials
(e.g., elastomers) that are either inherently tacky or that have been tackified with the addition of tackifying resins. Pressure sensitive adhesives according to the present disclosure include those that can be identified by any of the known methods for identifying pressure sensitive adhesives and include in particular those that can be identified by one or more of the following methods. According to a first method, pressure sensitive adhesives may be defined by the Dahlquist criteria described in Handbook of Pressure Sensitive Adhesive Technology, D. Satas, 2nd ed., page 172 (1989) at use temperatures. This criterion defines a good pressure sensitive adhesive as one having a 1 second creep compliance of greater than $1 \times 10^{-6}$ cm$^2$/dyne. Alternatively, since modulus is, to a first approximation, the inverse of compliance, pressure sensitive adhesives may be defined as adhesives having a modulus of less than $1 \times 10^6$ dynes/cm$^2$.

Another method of identifying a pressure sensitive adhesive is that it is aggressively and permanently tacky at room temperature and firmly adheres to a variety of dissimilar surfaces upon mere contact without the need of more than finger or hand pressure as described in "Glossary of Terms Used in the Pressure Sensitive Tape Industry" provided by the Pressure Sensitive Tape Council, August, 1985.

Another suitable method of identifying a pressure sensitive adhesive is that it preferably has a room temperature storage modulus within the area defined by the following points as plotted on a graph of modulus versus frequency at 25° C.: a range of moduli from approximately $2 \times 10^5$ to $4 \times 10^5$ dynes/cm$^2$ at a frequency of approximately 0.1 radian/second (0.017 Hz), and a range of moduli from approximately $2 \times 10^6$ to $8 \times 10^6$ dynes/cm$^2$ at a frequency of approximately 100 radians/second (17 Hz) (for example, see FIG. 8-16 on p. 173 Handbook of Pressure Sensitive Adhesive Technology, D. Satas, 2nd ed., (1989)).

In the following, the invention will be described in more detail with reference to particular embodiments without however the intention to limit the invention.

The adhesive article comprises a foam layer having an acrylic polymer obtainable by polymerization of a polymerizable composition comprising one or more alkyl acrylates having an average of 3 to 14 carbon atoms in the alkyl group, one or more polar monomers and one or more multi-functional monomers having at least two free radical polymerizable groups.

The one or more alkyl acrylates of the polymerizable composition are typically mono-functional monomers and include in particular acrylic acid ester of a nontertiary alcohol in which the alkyl group contains at least about 3 carbon atoms (on average), and preferably about 4 to about 14 carbon atoms (on average). Typically, the homopolymers of such monomers have a Tg of no greater than about 0° C. Examples of classes of suitable acrylic acid esters include, but are not limited to, 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, and isononyl acrylate. Preferred acrylic acid esters that can be used include, but are not limited to, 2-ethylhexyl acrylate, isooctyl acrylate, lauryl acrylate, and 2-methylbutyl acrylate. Various combinations of such monomers can be employed. For example, a combination of two or more alkyl acrylates may be used such as a combination of 2-ethylhexyl acrylate and isooctyl acrylate.

The polymerizable composition further includes one or more polar monomers, typically monofunctional polar monomers. Examples thereof include in particular acidic monomers such as carboxylic acid monomers as well as various acrylamides. Particular examples of polar monomers include acrylic acid, methacrylic acid, itaconic acid, maleic acid, fumaric acid, 2-hydroxyethyl acrylate or methacrylate, N-vinyl pyrrolidone, N-vinyl caprolactam, acrylamide, methacrylamide, N-substituted and N,N-disubstituted acrylamides such as N-ethyl acrylamide, N-hydroxyethyl acrylamide, N,N-dimethyl acrylamide, N,N-diethyl acrylamide, and N-ethyl, N-dihydroxyethyl acrylamide, acrylonitrile, methacrylonitrile and maleic anhydride. Preferred polar monomers include, but are not limited to, acrylic acid, itaconic acid, N,N-dimethyl acrylamide, acryl amide, N-vinyl pyrrolidone and N-vinyl caprolactam. Various combinations of such polar monomers can be employed and in a particular embodiment a combination of two or more polar monomers is contemplated such as for example a combination of acrylic acid and itaconic acid.

The polymerizable composition from which the acrylic polymer of the foam layer can be derived further includes one or more multi-functional monomers that have two or more ethylenically unsaturated groups. Examples of multi-functional monomers include in particular multi-functional acrylic monomers but other multi-functional monomers such as butadiene and substituted triazines such as vinyl-halomethyl-s-triazine type compounds such as for example 2,4-bis (trichloromethyl)-6-p-methoxystyryl-s-triazine. Preferred are polyacrylic-functional monomers such as, for example, pentaerythritol tetraacrylate, tripropyleneglycoldiacrylate, 1,12-dodecanediol diacrylate. Particular preferred examples of multi-functional acrylic monomers include 1,2 ethylene glycol diacrylate, hexane diol diacrylate and trimethylol propane triacrylate.

The acrylic polymer of the foam layer is typically obtainable from a polymerizable composition having a major amount of the one or more alkyl acrylates, for example at least 84% by weight (based on the total weight of monomers in the composition). A typical range is from 84 to 97% by weight or from 88 to 94% by weight. The amount of multi-functional monomer or monomers in the polymerizable composition is typically at least 0.01% by weight and may range for example from 0.01% by weight to 1% or less by weight of the total weight of monomers in the composition or for example from 0.1 to 0.5% by weight. The polar monomer or monomers are typically present in amount of at least 3% by weight of the total weight of monomers in the composition, an exemplary range being from 3 to 16% or from 5 to 12% by weight.

The polymerizable composition may contain further components including in particular a thixotropic agent. Examples of thixotropic agents include fumed silica. The polymerizable composition may also contain microsphere such as for example hollow glass bubbles or polymeric microspheres. Furthermore, it may be desirable to include a surfactant in the polymerizable composition. Tackifiers, in particular tackifiers suitable for use with acrylic adhesives may be added as well. Examples thereof include in particular rosin esters, aromatic resins, aliphatic resins, terpenes and partially hydrogenated and hydrogenated resins.

The polymerizable composition typically also includes an initiator for initiating a free radical polymerization including thermal as well as photo-initiators. Photoinitiators are preferred for use in connection with this disclosure. Examples of initiators can be found in U.S. Pat. No. 4,181,752 (Martens et al.), U.S. Pat. No. 4,833,179 (Young et al.), U.S. Pat. No. 5,804,610 (Hamer et al.), U.S. Pat. No. 5,382,451 (Johnson et al.), U.S. Pat. No. 4,619,979 (Kotnour et al.), U.S. Pat. No. 4,843,134 (Kotnour et al.), and U.S. Pat. No. 5,637,646 (Ellis). A particular example includes 2,2 dimethoxy-2-phenylacetophenone.

The foam layer of the adhesive article will typically have a thickness of at least 0.3 mm, for example at least 0.5 mm. A typical thickness range for the foam layer is from 0.3 mm up to 2 mm, for example from 0.5 mm up to 1.5 mm or from 0.7 mm to 1.2 mm. The foam layer typically has a cellular membrane structure which may have 15 to 85% of voids.

The foam layer is typically obtained and produced according to the methods described in U.S. Pat. No. 4,415,615. The process typically comprises frothing the polymerizable composition, coating the froth on a backing such as for example a release liner and polymerizing the polymerizable composition.

Frothing is conveniently accomplished by whipping a gas into the polymerizable composition. Useful frothing gases typically are inert and include nitrogen gas or carbon dioxide. In a particular embodiment, the monomers of the polymerizable composition may be partially polymerized prior to frothing so as to achieve a desirable viscosity for the frothing step. Useful viscosities to froth a composition are typically between 1000 and 40,0000 cps. The viscosity is typically selected so as to achieve a desired cell uniformity. For example, above 5000 cps, a higher cell uniformity will typically be obtained.

Additionally and alternatively to using prepolymerization to achieve a desired viscosity, a thixotropic agent such as fumed silica may be used. In such case, polymerization may be carried out in one step.

Polymerization of the polymerizable composition may be carried out by heat activation but is preferably is photoinitiated and hence the polymerizable composition will typically contain a photoinitiator. Typically, photoinitiation is carried out by UV irradiation and a UV initiator will be used. If the polymerization is carried out in two steps (in case of prepolymerization to enable a suitable viscosity as described above), the amount of photo-initiator initially used may be enough to allow initiation of further polymerization. Typically however, a further addition of photoinitiator may be desired to initiate further polymerization following frothing.

When the polymerization is to be effected by ultraviolet radiation, the polymerizable coating is preferably protected from air by a plastic film overlay which is fairly transparent to ultraviolet radiation and has a low-adhesion surface. Biaxially-oriented polyethylene terephthalate film which is about 75% transparent to ultraviolet radiation is very useful. If the underlying backing also has a low-adhesion surface, both the backing and the transparent plastic film can be stripped away so that the cellular adhesive membrane may be used for mounting objects. For such use, the cellular membrane may be reinforced by a tissue-like web to avoid becoming distorted if it is to be removed from both the backing and the transparent overlay before being applied.

If instead of covering the polymerizable coating, the polymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), which also teaches that by doing so, thick coatings can be polymerized in air.

Regardless of the process by which the cellular structure of the adhesive membrane is created, it is preferred to include a surfactant in the composition, preferably a silicone or a fluorochemical known to be useful for foaming organic liquids that have low surface tension. By doing so, foams with cellular adhesive membranes of good uniformity can be produced wherein the cells have an average diameter within the range of 0.05 to 0.3 mm. Typically, 90% of the cells of the adhesive membrane vary in size no more than 2:1, but some of the adhesive membranes have been characterized by significant variations in cell size.

On one or both opposite major sides of the foam layer is provided a pressure sensitive adhesive layer (also called skin layer) that comprises a cross-linked rubber. The cross-linked rubber may be obtained from crosslinking, typically through e-beam, of a cross-linkable block copolymer that has a rubbery block and a glassy block. Generally, a rubbery block exhibits a glass transition temperature (Tg) of less than room temperature. In some embodiments, the Tg of the rubbery block is less than about 0° C., or even less than about −10° C. In some embodiments, the Tg of the rubbery block is less than about −40° C., or even less than about −60° C.

Generally, a glassy block exhibits a Tg of greater than room temperature. In some embodiments, the Tg of the glassy block is at least about 40° C., at least about 60° C., at least about 80° C., or even at least about 100° C.

A suitable block copolymer includes one or more a rubbery blocks, R, and one or more glassy blocks, G. In some embodiments, the block copolymer comprises at least three glassy blocks. In some embodiments, the block copolymer comprises between three and five glassy blocks, inclusive. In some embodiments, the block copolymer comprises four glassy blocks.

In some embodiments, the block copolymer is a multi-arm block copolymer having the general formula $Q_n$-Y, wherein Q represents an arm of the multi-arm block copolymer; n represents the number of arms and is a whole number of at least 3; and Y is the residue of a multifunctional coupling agent. Each arm, Q, independently has the formula R-G, wherein G represents the glassy block; and R represents the rubbery block.

In some embodiments, the rubbery block comprises a polymerized conjugated diene, a hydrogenated derivative of a polymerized conjugated diene, or combinations thereof. In some embodiments, the conjugated dienes comprise 4 to 12 carbon atoms. Exemplary conjugated dienes include butadiene, isoprene, ethylbutadiene, phenylbutadiene, piperylene, pentadiene, hexadiene, ethylhexadiene, and dimethylbutadiene. The polymerized conjugated dienes may be used individually or as copolymers with each other. In some embodiments, the conjugated diene is selected from the group consisting of isoprene, butadiene, ethylene butadiene copolymers, and combinations thereof.

In some embodiments, at least one glassy block comprises a polymerized monovinyl aromatic monomer. In some embodiments, both glassy blocks of a triblock copolymer comprise a polymerized monovinyl aromatic monomer. In some embodiments, the monovinyl aromatic monomers comprise 8 to 18 carbon atoms. Exemplary monovinyl aromatic monomers include styrene, vinylpyridine, vinyl toluene, alpha-methyl styrene, methyl styrene, dimethylstyrene, ethylstyrene, diethyl styrene, t-butylstyrene, di-n-butylstyrene, isopropylstyrene, other alkylated-styrenes, styrene analogs, and styrene homologs. In some embodiments, the monovinyl aromatic monomer is selected from the group consisting of styrene, styrene-compatible monomers or monomer blends, and combinations thereof.

As used herein, "styrene-compatible monomers or monomer blends" refers to a monomer or blend of monomers, which may be polymerized or copolymerized, that preferentially associate with polystyrene or with the polystyrene endblocks of a block copolymer. The compatibility can arise from actual copolymerization with monomeric styrene; solubility of the compatible monomer or blend, or polymerized monomer or blend in the polystyrene phase during hot melt or solvent processing; or association of the monomer or blend with the styrene-rich phase domain on standing after processing.

In the general formula for some multi-arm block copolymers of the present disclosure, $Q_n$-Y, n represents the number of arms and is a whole number of at least 3, i.e., the multi-arm block copolymer is a star block copolymer. In some embodiments, n is ranges from 3-10. In some embodiments, n ranges from 3-5. In some embodiments, n is 4. In some embodiments, n is equal to 6 or more.

In some embodiments, the first block copolymer is a polymodal block copolymer. As used herein, the term "polymodal" means that the copolymer comprises glassy blocks having at least two different molecular weights. Such a block copolymer may also be characterized as having at least one "high" molecular weight glassy block, and at least one "low" molecular weight glassy block, wherein the terms high and low are used relative to each other. In some embodiments the ratio of the number average molecular weight of the high molecular weight glassy block, $(Mn)_H$, relative to the number average molecular weight of the low molecular weight glassy block, $(Mn)_L$, is at least about 1.25.

In some embodiments, $(Mn)_H$ ranges from about 5,000 to about 50,000 g/mol. In some embodiments, $(Mn)_H$ is at least about 8,000, and in some embodiments at least about 10,000. In some embodiments, $(Mn)_H$ is no greater than about 35,000 g/mol. In some embodiments, $(Mn)_L$ ranges from about 1,000 to about 10,000 g/mol. In some embodiments, $(Mn)_L$ is at least about 2,000, and, in some embodiments, at least about 4,000. In some embodiments, $(Mn)_L$ is less than about 9,000 g/mol, and, in some embodiments, less than about 8,000 g/mol.

In some embodiments, the first block copolymer is an asymmetric block copolymer. As used herein, the term "asymmetric" means that the arms of the block copolymer are not all identical. Generally, a polymodal block copolymer is an asymmetric block copolymer (i.e., a polymodal asymmetric block copolymer) as not all arms of a polymodal block copolymer are identical since the molecular weights of the glassy blocks are not all the same. In some embodiments, the block copolymers of the present disclosure are polymodal, asymmetric block copolymers. Methods of making asymmetric, polymodal block copolymers are described in, e.g., U.S. Pat. No. 5,296,547.

Generally, the multifunctional coupling agent may be any polyalkenyl coupling agent or other material known to have functional groups that can react with carbanions of the living polymer to form linked polymers. The polyalkenyl coupling agent may be aliphatic, aromatic, or heterocyclic. Exemplary aliphatic polyalkenyl coupling agents include polyvinyl and polyalkyl acetylenes, diacetylenes, phosphates, phosphites, and dimethacrylates (e.g., ethylene dimethacrylate). Exemplary aromatic polyalkenyl coupling agents include polyvinyl benzene, polyvinyl toluene, polyvinyl xylene, polyvinyl anthracene, polyvinyl naphthalene, and divinyldurene. Exemplary polyvinyl groups include divinyl, trivinyl, and tetravinyl groups. In some embodiments, divinylbenzene (DVB) may be used, and may include o-divinyl benzene, m-divinyl benzene, p-divinyl benzene, and mixtures thereof. Exemplary heterocyclic polyalkenyl coupling agents include divinyl pyridine, and divinyl thiophene. Other exemplary multifunctional coupling agents include silicon halides, polyepoxides, polyisocyanates, polyketones, polyanhydrides, and dicarboxylic acid esters.

Still further, the cross-linked rubber of the pressure sensitive adhesive layer may be obtained from the cross-linking of a linear block copolymer of the formula

R-(G)$_m$ wherein R represents a rubbery block, G represents a glassy block, and m, the number of glassy blocks, is 1 or 2. In some embodiments, m is one, and the linear block copolymer is a diblock copolymer comprising one rubbery block and one glassy block. In some embodiments, m is two, and the linear block copolymer comprises two glassy endblocks and one rubbery midblock, i.e., the linear block copolymer is a triblock copolymer.

In some embodiments, the rubbery block of the linear block copolymer comprises a polymerized conjugated diene, a hydrogenated derivative thereof, or combinations thereof. In some embodiments, the conjugated dienes comprise 4 to 12 carbon atoms. Exemplary conjugated dienes useful in the second block copolymer include any of the exemplary conjugated dienes described above.

In some embodiments, at least one glassy block, and in some embodiments, each glassy block of the linear block copolymer comprises a polymerized monovinyl aromatic monomer. In some embodiments, the monovinyl aromatic monomers comprise 8 to 18 carbon atoms. Exemplary polymerized monovinyl aromatic monomers useful in the second block copolymer include any of the exemplary polymerized monovinyl aromatic monomer, as described above.

In a particular embodiment a mixture of the linear block copolymer and the aforementioned and described multi-arm block copolymer is used to obtain the cross-linked rubber of the pressure sensitive adhesive layer. In some embodiments, the ratio of multi-arm block copolymers to linear block copolymers ranges from 1.5:1 to 9:1. In some embodiments, the ratio of multi-arm block copolymers to linear block copolymer is at least 1.85:1, or even at least 3:1. In some embodiments, the ratio of multi-arm block copolymers to linear block copolymers is no greater than 5.7:1, or even no greater than 4:1.

The pressure sensitive adhesive layer in a particular embodiment further includes one or more tackifiers and optionally one or more plasticizers. Generally, a tackifier will be selected to be compatible with a rubbery block of a block copolymer as may be used for obtaining the cross-linked rubber. As used herein, a tackifier is "compatible" with a block if it is miscible with that block. Generally, the miscibility of a tackifier with a block can be determined by measuring the effect of the tackifier on the Tg of that block. If a tackifier is miscible with a block it will alter (e.g., increase) the Tg of that block.

A tackifier is "primarily compatible" with a block if it is at least miscible with that block, although it may also be miscible with other blocks. For example, a tackifier that is primarily compatible with a rubbery block will be miscible with the rubbery block, but may also be miscible with a glassy block.

Generally, resins having relatively low solubility parameters tend to associate with the rubbery blocks; however, their solubility in the glassy blocks tends to increase as the molecular weights or softening points of these resins are lowered. Exemplary tackifiers that are primarily compatible with the rubbery blocks include polymeric terpenes, hetero-functional terpenes, coumarone-indene resins, esters of rosin acids, disproportionated rosin acid esters, hydrogenated rosin acids, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and blends thereof.

In particular embodiments, a first high Tg tackifier having a glass transition temperature (Tg) of at least 60 degrees Celsius (° C.). As used herein, the terms "high glass transition temperature tackifier" and "high Tg tackifier" refers to a tackifier having a glass transition temperature of at least 60° C. In some embodiments, the first high Tg tackifier has a Tg of at least 65° C., or even at least 70° C. In some embodiments, the first high Tg tackifier has a softening point of at least about 115° C., and, in some embodiments, at least about 120° C.

In some embodiments, the block copolymer adhesive compositions include a second high Tg tackifier that is primarily compatible with the glassy block(s) of the multi-arm block copolymer and, optionally, with the glassy block(s) of the linear block copolymer. Generally, a tackifier that is primarily compatible with a glassy block is miscible with the glassy block and may be miscible with a rubbery block.

Generally, resins having relatively high solubility parameters tend to associate with the glassy blocks; however, their solubility in the rubbery blocks tends to increase as the molecular weights or softening points of these resins are lowered. Exemplary tackifiers that are primarily compatible with the glassy blocks include coumarone-indene resins, rosin acids, esters of rosin acids, disproportionated rosin acid esters, C9 aromatics, alpha-methyl styrene, C9/C5 aromatic-modified aliphatic hydrocarbons, and blends thereof.

In some embodiments, the pressure sensitive adhesive layer further comprises at least one component selected from the group consisting of a low Tg tackifier, a plasticizer, and combinations thereof. As used herein, the term "low glass transition temperature tackifier" refers to a tackifier having a glass transition temperature of less than 60° C. Exemplary low Tg tackifiers include polybutenes.

Generally, a plasticizer is compatible with one or more blocks of the linear block copolymer, and/or one or more blocks of the multi-arm block copolymer. Generally, a plasticizer that is compatible with a block will be miscible with that block and will lower the Tg of that block. Exemplary plasticizers include naphthenic oils, liquid polybutene resins, polyisobutylene resins, and liquid isoprene polymers.

In some embodiments, the ratio of the total amount of high glass transition temperature tackifiers to block copolymers ranges from 0.8:1 to 1.25:1. In some embodiments, the ratio of the total amount of high Tg tackifiers to block copolymers is at least 0.85:1, or even at least 0.9:1. In some embodiments, the ratio of the total amount of high Tg tackifiers to block copolymers is no greater than 1.15:1, or even no greater that 1.1 to 1.

In some embodiments, the ratio of the rubbery block compatible high Tg tackifier to the glassy block compatible high Tg tackifier is ranges from 1:1 to 9:1. In some embodiments, the ratio of the rubbery block compatible high Tg tackifier to the glassy block compatible high Tg tackifier is at least 1.25:1, or even at least 1.5:1. In some embodiments the ratio of the rubbery block compatible high Tg tackifier to the glassy block compatible high Tg tackifier is no greater than 4:1, or even no greater than 3:1.

In a particularly preferred embodiment, the pressure sensitive adhesive layer also includes an acrylic pressure sensitive adhesive component. Typically, the pressure sensitive adhesive layer comprises at least about 0.1 parts, in some embodiments, at least about 0.5 parts, at least about 1 part, or even at least about 2 parts of an acrylic pressure sensitive adhesive component.

In a particular embodiment, the pressure sensitive adhesive layer comprise no greater than about 10 parts, in some embodiments, no greater than about 8 parts, no greater than about 5 parts, or even no greater than about 4 parts of the acrylic pressure sensitive adhesive component. The amount of cross-linked block copolymer will typically be between 30 and 60 or between 30 and 50 parts by weight of the total weight of the pressure sensitive adhesive layer.

In another embodiment, the acrylic pressure sensitive adhesive component may be comprised in the pressure sensitive adhesive layer in an amount of between 40 and 60 parts by weight. In this embodiment, the amount of cross-linked block copolymer will typically be between 10 and 20 parts by weight of the weight of the pressure sensitive adhesive layer.

Typically, the acrylic pressure sensitive adhesive component of the pressure sensitive adhesive layer is an acrylic polymer derived from one or more acrylic esters of a non-tertiary alkyl alcohol that contains 3 to 14 carbon atoms. Exemplary acrylic acid esters include isooctyl acrylate, 2-ethylhexyl acrylate, butyl acrylate, isobornyl acrylate, and combinations thereof. Exemplary methacrylic acid esters include the methacrylate analogues of these acrylic acid esters. Typically, the acrylic polymer will further comprises one or more units derived from a polar monomer such as for example described above.

In some embodiments, the acrylic polymer comprises at least about 70 parts, in some embodiments, at least about 80 parts, at least about 90 parts, at least about 95 parts, or even about 100 parts of at least one acrylic or methacrylic ester of a non-tertiary alkyl alcohol. In some embodiments, acrylic polymer comprises no greater than about 30 parts, in some embodiments, no greater than about 20 parts, no greater than about 10 parts, no greater than about 5 parts, and even no greater than 1 part of at least one copolymerized polar monomer. In some embodiments, the acrylic adhesive composition does not include a copolymerized polar monomer.

In some embodiments, the ratio of the combination of the block copolymers and high Tg tackifiers to the acrylic pressure sensitive adhesive component is at least 8.3:1. In some embodiments, the ratio of the combination of the block copolymers and high Tg tackifiers to the acrylic pressure sensitive adhesive component is at least 12.5:1, at least 22:1, at least 90:1, or even at least 180:1.

In some embodiments, the ratio of the combination of the block copolymers, high Tg tackifiers, and acrylic pressure sensitive adhesive component to the liquid plasticizer ranges from 32:1 to 10:1. In some embodiments, the ratio of the combination of the block copolymers, high Tg tackifiers, and acrylic pressure sensitive adhesive component to the liquid plasticizer is no great than 25:1, or even no greater than 20:1. In some embodiments, the ratio of the combination of the block copolymers, high Tg tackifiers, and acrylic pressure sensitive adhesive component to the liquid plasticizer is at least 12.5:1.

The pressure-sensitive adhesive compositions for providing the pressure sensitive adhesive layer on the foam layer can be made using methods known in the art. For example, they can be made by dissolving the block copolymers, suitable tackifiers, any plasticizer(s), and any other additives including an acrylic pressure sensitive adhesive component in a suitable solvent, and coating onto a release liner or directly onto the foam layer using conventional means (e.g., knife coating, roll coating, gravure coating, rod coating, curtain coating, spray coating, air knife coating). In some embodiments, the pressure-sensitive adhesive composition of the pressure sensitive adhesive layer is prepared in a substantially solvent-free process (i.e., the adhesive contain no greater than about 20 wt. % solvent, in some embodiments, no greater than about 10 wt. % solvent and, in some embodiments, no greater than about 5 wt. % solvent, in some embodiments, no greater than 1 wt. % solvent, or even no greater than trace amounts of solvent (i.e., essentially no solvent). Such substantially solvent-free processes are known and include, e.g., compounding by calendaring or roll milling, and extruding (e.g., single. screw, twin screw, disk screw, reciprocating single screw, pin barrel single screw, etc.). Commercially available equipment such as BRABENDER or BANBURY internal mixers are also available to batch mix the adhesive compositions. After compounding, the adhesive may be coated through a die into a desired form, such as a layer of adhesive, or it may be collected for forming at a later time. In a particular embodiment the pressure sensitive adhesive composition may be extruded on the foam layer or may be extruded on a release liner and then subsequently laminated to the foam layer.

The pressure sensitive adhesive layer is typically applied on the foam layer at a weight per area of between 40 and 100 g/m².

In accordance with the method of making the adhesive article, the cross-linkable rubber, for example one or more cross-linkable block copolymers as described above, of the pressure sensitive layer is cross-linked. In a particular embodiment, the cross-linkable rubber is cross-linked by subjecting the pressure sensitive adhesive layer on the foam layer to e-beam irradiation. Typically, e-beam irradiation will be carried out with an acceleration voltage of between 100 and 300 keV and a dose of 2 to 9 MRad. In a particular embodiment the e-beam irradiation is focused at the interface of the pressure sensitive adhesive layer and foam layer. In another embodiment, the focus of the e-beam may be in the proximity of the interface, for example within about 10 and 30 micrometer of the interface, with the focus in the foam layer or in the pressure sensitive adhesive layer.

When the pressure sensitive adhesive composition having a cross-linkable rubber is provided on both opposite major sides of the foam layer, it will typically be preferred to irradiate such a laminate from both opposite major sides either sequentially of simultaneously.

In another embodiment, the pressure sensitive adhesive layer having a cross-linked rubber may be provided on only one of the major sides of the foam layer. The other major side may then be left without a further adhesive layer as the foam layer in accordance with the present disclosure will typically have useful pressure sensitive adhesive characteristics. In an alternative embodiment, a further adhesive layer may be provided on the major side opposite to the major side having the pressure sensitive adhesive layer with the cross-linked rubber. Such further adhesive layer may include any common pressure sensitive adhesive including acrylic pressure sensitive adhesive layers, silicone based adhesives, polyurethane based adhesives, poly-alpha olefins and the like.

In yet a further embodiment, a further adhesive layer provided on the opposite major side may include a heat-activatable adhesive layer. With heat-activatable adhesive layer is meant an adhesive that requires heating in order to develop its maximum bond strength in bonding to a substrate. A heat-activatable adhesive may or may not have useful pressure sensitive adhesive properties at room temperature (about 25° C.). Typically, a heat-activatable adhesive for use with the present disclosure will be based on a thermoplastic polymer such as for example a film of a copolymer of ethylene and propylene, thermoplastic polyurethane which may be tackified or not.

The adhesive articles in connection with the present disclosure can be used to bond to a substrate. Thus, the pressure sensitive adhesive layer of adhesive article is used to bond the article to a desired substrate. In a particular embodiment, such a substrate may have a low surface energy, for example of less than 45 dynes/cm or less than 40 dynes/cm or 35 dynes/cm or less.

The adhesive articles are particularly suitable for bonding various components including for example emblems, plastic body moldings and rubber gaskets to a body of a motor vehicle, in particular a car. For example, in one embodiment the adhesive article may be bonded through its pressure sensitive adhesive having a cross-linked rubber to the body of a car. A plastic molding, emblem and the like may be adhered to the adhesive article on the opposite major side which may or may not contain a further skin adhesive layer. Generally, the emblem, plastic molding or gasket will be first bonded to the adhesive article, and the resulting assembly may then be bonded to the motor vehicle, in particular the car.

In another embodiment, the adhesive article may be bonded on the major side opposite to the major side having the pressure sensitive adhesive layer comprising the cross-linked rubber to a rubber gasket. Such rubber gasket may be directly bonded to the foam layer of the adhesive article but is typically bonded thereto through a further skin adhesive layer that is provided on the foam layer. In one embodiment, such a skin adhesive layer may be a pressure sensitive adhesive and in another embodiment the skin adhesive layer comprises a heat activatable adhesive.

Adhesive articles provided with a rubber gasket as described in the previous paragraph can be readily applied to for example a door of a car so as to provide a door seal.

The invention will now be illustrated with reference to the following non-limiting examples. All parts are by weight unless otherwise stated.

EXAMPLES

Test Methods

Dynamic Shear Test:
A modified version of ISO4587: 2003 was employed.
The tape to be tested was applied with its specific side to the painted steel substrate. To the opposite side of that tape an aluminum coupon (50 mm×25 mm×1 mm) was applied.
The bonded tape area is 1.27 cm×2.54 cm horizontally applied.
The painted steel panels employed in this test method were obtained from a supplier mentioned in a separate section below. A basic description about the paints is provided in that separate section below as well.
Paint A and paint B were cleaned by wiping with a tissue saturated in n-heptane. Paint C was cleaned by wiping with a tissue saturated with a 1:1 volume mixture of water and isopropanol. For the test, the painted steel panel substrates were cut into coupons (50 mm×30 mm×1 mm).
The aluminum coupons were subjected to light abrasion with a Scotchbrite™ no. 7447™ scrubbing pad (available from 3M Company) followed by cleaning/wiping with a tissue saturated with Methylethyl ketone, and finally cleaned by wiping with a tissue saturated with a 1:1 volume mixture of water and isopropanol.
The assemblies were prepared by applying first the treated aluminum coupon side the exposed tape surface side, cut into an 1.27 cm×2.54 cm area. Then the liner is removed from the opposite specific tape area side and the cleaned painted steel panel coupon is applied to this tape surface, using a 6.8 kg roller over rolling the test specimen twice with a speed of 300 mm/min. After a dwell time of 20 min, 24 hrs or 72 hrs the dynamic shear strength test was performed with 10 mm/min or 50 mm/min cross-head speed. The test was repeated with 3 three repeating test samples and the average value was reported.
90° Peel Adhesion Test:
90° peel adhesion at 300 mm/min was measured according to Federation Internationale des Fabricants Europeens et Transformateurs d'Adhesifs et Thermocollants sur Papiers et autres Supports (FINAT) test method no. 2 with following exceptions:
The pressure sensitive adhesive layer of the present disclosure were allowed to dwell on the substrates before testing for 20 min, 24 hrs and/or 72 hrs, as indicated in the table below.
The width of the tested tapes was 1.27 cm rather than 2.5 cm as called for by the FINAT test.

A 150 μm thick aluminium strip being anodized on one side and having a width of 1.6 cm is applied by hand with anodized side to specific side of the tape to be tested to form a non-extendible backing.

A 6.8 kg roller was used to apply the tape to be tested to the substrate rather than 2 kg as required by the method. The 6.8 kg roller was rolled twice over the test specimen with a speed of 300 mm/min.

Substrates employed were painted steel panels obtained from a supplier mentioned in a separate section below. A basic description about the paints is provided in that separate section below as well. Paint A and Paint B were cleaned by wiping with a tissue saturated in n-heptane. Paint C was cleaned by wiping with a tissue saturated with a 1:1 volume mixture of water and isopropanol.

Results were reported in N/cm rather than N/2.5 cm as called for by the method.

Static Shear Test at Elevated Temperatures:

A standard static shear test was performed at elevated temperature according to Pressure Sensitive Tape Council (Chicago, Ill./USA) PSTC-107 (procedure G). The test was performed at 90° C. rather than 49° C. (120° F.) as called for by the method. The substrates employed were painted steel panels obtained from a supplier mentioned in a separate section below. A basic description about the paints is provided in that separate section below as well. Paint A and Paint B were cleaned by wiping with a tissue saturated in n-heptane. Paint C was cleaned by wiping with a tissue saturated with a 1:1 volume mixture of water and isopropanol.

The bonded sample area was 2.54 cm in the vertical direction by 1.27 cm in the width direction (rather than 1.27 cm×1.27 cm as called for by the method). To the tape side opposite to that side which will be applied with its specific side to the painted substrate, a 150 μm thick aluminium strip is applied superimposing the tape area to provide a means of a load weight as described in PSTC-7. This aluminium strip has a width of 1.6 cm and is anodized on one side. This anodized aluminium strip side is to be applied first to the tape area. Then a 6.8 kg roller was used to apply the specific side of the tape area to be tested to the painted substrate panel. The roller was rolled twice over the test specimen with a speed of 300 mm/min. After a dwell time of 24 hrs the test specimen were hung in the shear stand at elevated temperature. The shear stand with the test specimen was placed in a forced air oven held at the elevated temperature (90° C.) for 10 min to condition it and then the load of 750 g (rather than 1 kg as called for by the method) was hung from the end of the aluminum strip bonded to the tape area to be tested. The time to failure for the adhesive bond was recorded in minutes. After passing 10000 min of holding time the test was stopped.

Description of the Painted Metal Panels Used as Substrates in the Above Mentioned Tests:

Paint A:

1K acrylic powder coating, generation 9, automotive paint, coated on steel plates, obtained from DuPont Performance Coatings GmbH&Co.KG, Wuppertal.

Paint B:

1K acrylic powder coating, generation 8, automotive paint, coated on steel plates, obtained from DuPont Performance Coatings GmbH&Co.KG, Wuppertal.

Paint C:

2K clear coat, automotive paint containing nanoparticles, coated on steel plates, obtained from PPG Industries Lacke GmbH, Ingersheim.

Materials Used in the Examples:

TABLE 1

Summary of materials

| Abbreviation | Name | Source |
|---|---|---|
| AA | Acrylic Acid | |
| BA | Butyl acrylate | |
| IOA | Isooctyl acrylate | |
| 2-EHA | 2-Ethylhexyl acrylate | |
| HDDA | Hexanediol diacrylate | |
| Irgacure ™ 651 | 2,2 dimethoxy-2-phenylacetophenone | Ciba Specialty Chemicals Corp. (Tarrytown, NY) |
| IOTG | Isooctyl thioglycolate | |
| Kraton ™ 1161-D | SIS linear block copolymer (15% S, 19% diblock) | Kraton Polymers, Inc. (Houston, Texas) |
| Santicizer ™ 141 | 2-ethylhexyl diphenyl phosphate | Ferro Co. (Bridgeport, New Jersey) |
| Escorez ™ 1310 | Aliphatic C-5 tackifying resin | ExxonMobil Chemical LTD. (Southampton, Hampshire, GB) |
| 4900 MB | Black pigment having a 50/50 blend of carbon black in ethylene vinyl acetate copolymer resin having a melt index of about 150 | MA Hanna Color (Suwannee, Georgia) |
| Superester ™ W-115 | Stabilized rosin acid ester | Arakawa Chemical USA (Chicago, IL) |
| Irganox ™ 1010 | Pentaerythritol tetrakis (3-(3,5-di-tert-butyl-4-hydroxyphenyl)propionate) | Ciba Specialty Chemicals Corp. (Tarrytown, NY) |
| Tinuvin ™ 328 | 2-(2-hydroxy-3,5-di-(tert)-amylphenyl)benzotriazole | Ciba Specialty Chemicals Corp. (Tarrytown, NY) |
| Regalite ™ R1125 | Hydrogenated hydrocarbon resin | Eastman Chemical Co. (Kingsport, TN) |
| Cumar ™ 130 | Aromatic thermoplastic resin | Neville Chemical Co. (Pittsburgh, PA) |
| Nyplast ™ 222B | Naphthenic oil plasticizer | Nynas Naphthenics AB (Stockholm, Sweden) |
| K15 | Hollow glassbubbles | 3M Co. |
| Surfactant | Fluoroaliphatic polymer | 3M Co. |
| Aerosil ™ 972 | Hydrophobic fumed silica | Evonik |

Preparation of Acrylic Polymers:

Acrylic Polymer 1 (AP-1) was prepared by mixing 45 parts of IOA; 45 parts of BA; 10 parts of AA; 0.15 part IRGACURE 651; and 0.06 part of IOTG. Discreet film packages were formed from a packaging film (0.0635 mm thick ethylene vinyl acetate copolymer film sold as VA-24 Film from CT Film, Dallas, Tex.). The AP-I composition was sealed into the film packages, which measured approximately 10 centimeters (cm) by 5 cm by 0.5 cm thick. While immersed in a water bath maintained between about 21° C. and about 32° C., the packages were exposed to ultraviolet (UV) radiation having an intensity of about 3.5 milliwatts per square centimeter (mW/sq cm), and a total energy of about 1680 milliJoules per square centimeter (mJ/sq cm) as measured in NIST units. The method of forming the packages and curing are described in Example 1 of U.S. Pat. No. 5,804,610, the subject matter of which is incorporated herein by reference in its entirety.

Acrylic Polymer 2 (AP-2) was prepared according to the procedure for AP-1, except that 85 parts of 2-EHA; 15 parts of AA; 0.15 parts of IRGACURE 651; and 0.8 part IOTG were used. Similarly, Acrylic Polymer 3 (AP-3) was prepared according to the procedure for Acrylic Polymer 1 except that the composition was 95 parts of 2-EHA; 5 parts of AA; 0.15 part IRGACURE 651; and 0.03 part of IOTG. AP-2 and AP-3 were placed in packages and exposed to UV energy, according to the procedure for AP-1.

First Skin Adhesive (SA-1):

Pressure-sensitive adhesives according to the compositions shown in Table 2 were compounded using a 60 mm, co-rotating twin screw extruder (available from Berstorff), (the "first adhesive extruder"). A polymodal, asymmetric star block copolymer ("PASBC") was prepared according to U.S. Pat. No. 5,393,373, the subject matter of which is hereby incorporated by reference in its entirety. The polymer had number average molecular weights of about 4,000 Dalton and about 21,500 Dalton for the two endblocks, 127,000-147,000 Dalton for the arm, and about 1,100,000 Dalton for the star measured by SEC (size exclusion chromatography) calibrated using polystyrene standards. The polystyrene content was between 9.5 and 11.5 percent by weight. The mole percentage of high molecular weight arms was estimated to be about 30%.

The polymodal asymmetric block copolymer and a linear styrene-isoprene-styrene (SIS) block copolymer (KRATON 1161-D) were dry fed into the first zone of the first adhesive extruder. Using a roll-feed extruder (available from Berstorff), acrylic polymer AP-1 was heated and fed into the third zone of the first adhesive extruder. Antioxidant (IRGANOX 1010), ultraviolet light absorber (TINUVIN 328), pigmented EVA (4900 CMB) were dry fed; and (REGALITE R 1125); (CUMAR 130); and (NYPLAST 222B) were melt fed in to various zones of the first adhesive extruder.

TABLE 2

First skin adhesive composition (SA-1)

| Component | Amount in weight percent |
| --- | --- |
| PASBC* | 31.19 |
| Kraton 1161D | 13.37 |
| Regalite R1125 | 30.91 |
| Cumar 130 | 10.30 |
| Nyplast 222B | 7.20 |
| Irganox 1010 | 1.34 |
| Tinuvin 328 | 1.34 |
| 4900 CMB | 0.38 |
| AP-1 | 4 |

*Polymodal, asymmetric star block copolymer

Second Skin Adhesive (SA-2):

A pressure sensitive adhesive was compounded in a 60 mm, co-rotating twin screw extruder (available from Berstorff) (the "second adhesive extruder") in a similar manner as described for the first skin adhesives, except that the composition was as follows: 12.70% of the polymodal, asymmetric star block copolymer (PASBC); 53.10% (by weight) AP-1; 23.30% tackifying resin (ESCOREZ 1310LC); 3.80% tackifying resin (SUPERESTER W115; 6.20% plasticizer (SANTICIZER 141); 0.26% antioxidant (IRGANOX 1010); 0.25% ultraviolet light absorber (TINUVIN 328) and 0.38% CMB 4900.

Double-Sided Foam Tape Samples

Example A

The Foam core (FC-1) having the composition shown in Table 3 was compounded according to the following procedure. Black pigmented EVA (4900 CMB) was dry fed in to the first zone of a 90 mm, co-rotating twin screw extruder (the "core extruder") (available from Berstorff, Hannover, Germany). Using a roll-feed extruder (available from Berstorff), both acrylic polymers AP-2 and AP-3 were heated and fed into the second zone of the core extruder. DUALITE U010-185D expandable microspheres (expandable microspheres having a shell composition containing acrylonitrile and methacrylonitrile and a core of isopentane, available from Henkel Corporation (Gulph Mills, Pa.) were fed into the ninth zone of the core extruder.

TABLE 3

Foam core composition FC-1 and properties

| Components Parts By Weigh Percent (%) AP-3 | Components Parts By Weigh Percent (%) AP-2 | Components Parts By Weigh Percent (%) Microspheres | Components Parts By Weigh Percent (%) Pigment | Foam Densitiy (g/cm³) | Thickness (mm) |
| --- | --- | --- | --- | --- | --- |
| 91.12 | 4.8 | 3.70 | 0.38 | 0.53 | 0.7 |

Three-layer co-extruded tape samples were prepared by coextruding a first skin adhesive layer, a foam core layer as the middle layer, and a second skin adhesive layer.

The second skin adhesive was compounded in the second adhesive extruder, as described above, and fed through an outer layer of a three-layer, multi-manifold film die obtained from Cloeren Inc. (Orange, Tex.). A foam core layer was compounded in the core extruder, as described above, and fed to the center layer of the three-layer die. A first skin adhesive was compounded in the first adhesive extruder, as described above, and fed to the outer layer of the three-layer die, opposite the second skin adhesive.

Upon exiting the die, the co-extruded layers were cast onto a silicone release coated casting roll. The roll was cooled with water having a temperature of about 12° C. The cooled extrudate was transferred from the casting roll to a 0.117 mm thick two-side silicone coated polyethylene release liner that was transported at the same speed as the casting roll to the end of the web transport line. The first skin adhesive was in contact with the liner after the transfer whereas the second skin adhesive was open to the air. The liner had differential release properties which allow the tape to be unrolled after winding without liner confusion. Release liners are well-known in the art, and any known release liner may be used. Typically, the release liner comprises a film or paper substrate coated with a release material. Commercially available release liners include, but are not limited to, silicone coated papers, and silicone coated films, such as polyester films. Suitable release liners are also disclosed in U.S. Pat. Nos. 6,835,422; 6,805,933; 6,780,484; and 6,204,350 assigned to 3M Innovative Properties Company.

The foam core and both adhesive skins were crosslinked on-web using electron beam curing while supported on the liner. Two sequential irradiation steps acting on opposite faces of the tape were employed. The first skin adhesive was irradiated through the polyethylene liner, whereas the second skin adhesive was irradiated in an open-face condition. The electron beam units were BROADBAND curtain-type electron beam processors (PCT Engineered Systems, LLC, Davenport, Iowa), operated according the acceleration voltage and dose conditions provided in Table 4.

While nitrogen gas was fed into the frother, the frothed syrup was delivered through a tube to a knife coater between a pair of transparent, biaxially-oriented polyethylene terephthalate films, the facing surfaces of which had low-adhesion coatings. The composite emerging from the knife coater was irradiated with a bank of fluorescent black light bulbs (Sylvania F20T12BL), 90% of the emissions of which were between 300 and 400 nm with a maximum at 351 nm to complete the polymerisation to a pressure sensitive adhesive foam layer. The total exposure was 1360 mJ/cm$^2$ as measured by an EIT UV Radiometer which is spectrally responsive between 250 and 430 nm, maximum 350 nm. The composite was cooled by blowing air against both films during the irradiation to keep the temperature of the films below 85° C. to avoid wrinkling of the films. The PET process liners finally are stripped and a double-sided siliconized release paper liner is laminated to one of the two tape surfaces to allow for the roll winding and unwinding later on.

TABLE 5

Composition of Example B and C:

| Example Nr. | Monomers Ratio 2-EHA/AA [%] | Crosslinker HDDA [%] | Solids Pigment + Glassbubbles + Aerosil [%] | Flow rate kg/h | Nitrogen flow l/h | Pressure kPa | Caliper [μm] |
|---|---|---|---|---|---|---|---|
| B | 2-EHA/AA 83.4%/8.0% | 0.1 | 8.5 | 550 | 8.7 | 250 | 800 |
| C | 2-EHA/AA = 83.4%/8.0% | 0.1 | 8.5 | 550 | 8.7 | 250 | 1200 |

TABLE 4

Composition of three-layer tape sample

| Example | Foam Core | First skin adhesive (SA-1) Acceleration Voltage (keV) | First skin adhesive (SA-1) Dose (MRad) | Second skin adhesive (SA-2) Acceleration Voltage (keV) | Second skin adhesive (SA-2) Dose (MRad) |
|---|---|---|---|---|---|
| A | FC-1 | 247 | 11.5 | 235 | 10 |

Example B

Into the mixture of the photopolymerizable monomers (2-EHA and AA) was stirred 0.04% by weight of 2,2-dimethoxy-2-phenyl acetophenone (obtainable as "Irgacure" 651). This was partially polymerized to provide a syrup about 3000 cps in viscosity by exposure to ultraviolet radiation. To the syrup was added 0.20% by weight of additional "Irgacure" 651 and crosslinking agent HDDA. To this prepolymer mixture the fillers Aerosil 972 and the glass bubbles were added and slowly mixed using a motorized stirrer equipped with an air motor. After degassing and the addition of surfactant and pigments the mixture was transferred to a frother operating at 300 rpm.

Samples 1 to 8:

The following examples were generated by applying a layer of the above mentioned first skin adhesive SA-1 (which was used to make Example A) onto the surface of the foam layer of Example B, followed by an e-beam radiation process.

Several methods can be employed to apply a layer of the first skin adhesive onto the foam layer of Example B:

A) Laminating a transfer tape, obtained by hot melt coating the skin adhesive formulation onto a doublesided siliconized release carrier liner, to the foam layer (lamination force: typically 50 N per web width.)
B) Directly hotmelt coating onto the surface of the foam layer using a slot die.
C) Directly hotmelt coating onto the surface of the foam layer via an extrusion line and using a rotary rod die.
D) Directly coating of a solvent based formulation of the skin adhesive onto the foam layer, followed by an oven drying process.

Various e-beam radiation curing conditions were employed (Oxygen level in the e-beam chamber: always below 50 ppm).

TABLE 6

Process conditions for E-beam radiation

| Method of post e-beam radiation | e-beam dosage [MRad] | Acceleration Voltage [keV] | Beam Current [mAmpere] | Line Speed [m/min] |
|---|---|---|---|---|
| EB1 | 6 | 190 | 1.9 | 3 |
| EB2 | 6 | 220 | 2.2 | 3 |
| EB3 | 8 | 210 | 2.9 | 3 |

TABLE 6-continued

Process conditions for E-beam radiation

| Method of post e-beam radiation | e-beam dosage [MRad] | Acceleration Voltage [keV] | Beam Current [mAmpere] | Line Speed [m/min] |
|---|---|---|---|---|
| EB4 | 6 | 210 | 2.2 | 3 |
| EB5 | 4 | 210 | 1.5 | 3 |
| EB6 | 2 | 210 | 1.2 | 5 |

The following table summarizes the constructions of the various samples:

TABLE 7

| Sample Nr. | Type of skin adhesive | Coat weight of skin layer [g/m$^2$] | Foam Core | Process method of making the respective sample | Temperature of the extrusion line [° C.] | Temperature of the coating die [° C.] | Method of post e-beam treatment |
|---|---|---|---|---|---|---|---|
| Sample 1 | SA-1 | 60 | Example B | A | 200 | 175 | EB1 |
| Sample 2 | SA-1 | 60 | Example B | A | 175 | 175 | EB2 |
| Sample 3 | SA-1 | 85 | Example B | C | 200 | 200 | EB3 |
| Sample 4 | SA-1 | 85 | Example B | C | 200 | 200 | EB4 |
| Sample 5 | SA-1 | 85 | Example B | C | 200 | 200 | EB5 |
| Sample 6 | SA-1 | 85 | Example B | C | 200 | 200 | EB6 |
| Sample 7 | SA-1 | 85 | Example B | D | Oven drying | Oven drying | EB4 |
| Sample 8 | SA-1 | 85 | Example C | B | None | 208 | EB6 |

The samples summarized in table 7 were adhered with the pressure sensitive adhesive skin layer to the substrate as indicated in the tables below which summarize the results obtained using the test methods set out above.

Test Results:

TABLE 8

Dynamic Shear Test Results:

| Example # | Substrate | Dwell Time | Jaw Speed [mm/min] | Dynamic Shear Strength [N/cm$^2$] | Type of Failure Mode |
|---|---|---|---|---|---|
| Sample1 | Paint C | 72 hrs. | 50 | 126 | FS/pop |
| Sample 2 | Paint C | 72 hrs. | 50 | 128 | pop |
| Example A | Paint C | 72 hrs | 50 | 74 | FS |
| Example B | Paint C | 72 hrs | 50 | 89 | pop |
| Sample 1 | Paint C | 24 hrs | 50 | 102 | FS/2B |
| Sample 2 | Paint C | 24 hrs | 50 | 115 | FS/2B |
| Example A | Paint C | 24 hrs | 50 | 66 | FS |
| Example B | Paint C | 24 hrs | 50 | 81 | pop |
| Sample 4 | Paint A | 24 hrs | 10 | 100 | FS |
| Sample 5 | Paint A | 24 hrs | 10 | 97 | FS |
| Sample 6 | Paint A | 24 hrs | 10 | 86 | FS |
| Sample 7 | Paint A | 24 hrs | 10 | 93 | FS |
| Sample 8 | Paint A | 24 hrs | 10 | 84 | 2B/FS |
| Example A | Paint A | 24 hrs | 10 | 45 | FS |
| Example B | Paint A | 24 hrs | 10 | 43 | pop |
| Example C | Paint A | 24 hrs | 10 | 34 | pop |

TABLE 9

90° Peel Adhesion Test Results:

| Example # | Substrate | Dwell Time | Jaw Speed [mm/min] | Average peel force [N/cm] | Type of Failure Mode |
|---|---|---|---|---|---|
| Sample 1 | Paint C | 72 hrs. | 300 | 41 | pop |
| Sample 2 | Paint C | 72 hrs. | 300 | 43 | pop |
| Example A | Paint C | 72 hrs | 300 | 45 | FS |
| Example B | Paint C | 72 hrs. | 300 | 14 | pop |
| Sample 1 | Paint C | 24 hrs | 300 | 38 | Pop sh |
| Sample 2 | Paint C | 24 hrs | 300 | 33 | Pop smooth |
| Example A | Paint C | 24 hrs | 300 | 43 | FS |
| Example B | Paint C | 24 hrs | 300 | 11 | pop |
| Sample 4 | Paint A | 24 hrs | 300 | 33 | pop |
| Sample 5 | Paint A | 24 hrs | 300 | 35 | Pop |
| Sample 6 | Paint A | 24 hrs | 300 | 39 | pop |
| Sample 7 | Paint A | 24 hrs | 300 | 20 | pop |
| Sample 8 | Paint A | 24 hrs | 300 | 41 | pop |
| Example A | Paint A | 24 hrs | 300 | 40 | FS |
| Example B | Paint A | 24 hrs | 300 | 7 | pop |
| Example C | Paint A | 24 hrs | 300 | 8 | pop |

Failure modes:
FS = foam split
Pop = pop off panel
2B = 2-bond failure mode
FS/2B = mixed failure mode of foam split and 2-bond failure mode
Pop sh = shocky pop of panel

TABLE 10

Results of Static Shear Test @ 90° C.

| Example # | Substrate | Dwell Time | Holding Time [min] | Load [g] | Type of Failure Mode |
|---|---|---|---|---|---|
| Sample 1 | Paint C | 24 hrs. | >10000 | 750 | none |
| Sample 2 | Paint C | 24 hrs. | >10000 | 750 | none |
| Example A | Paint C | 24 hrs | <1900 | 750 | FS |
| Example B | Paint C | 24 hrs | >10000 | 750 | none |
| Sample 3 | Paint A | 24 hrs | 2 × >10000 1 × 7211 | 750 | none 2B |
| Sample 4 | Paint A | 24 hrs | 2 × >10000 1 × 641 | 750 | none 2B |
| Sample 5 | Paint A | 24 hrs | 2 × >10000 1 × 1493 | 750 | none 2B |
| Sample 6 | Paint A | 24 hrs | <169 | 750 | 2B |
| Sample 8 | Paint A | 24 hrs | 7 | 1000 | 2B |
| Example A | Paint A | 24 hrs | 121 | 1000 | 2B |
| Example A | Paint B | 24 hrs | <1045 | 750 | FS/pop |

TABLE 10-continued

Results of Static Shear Test @ 90° C.

| Example # | Substrate | Dwell Time | Holding Time [min] | Load [g] | Type of Failure Mode |
|---|---|---|---|---|---|
| Example B | Paint B | 24 hrs | >10000 | 750 | none |
| Example C | Paint A | 24 hrs | >10000 | 1000 | none |

The invention claimed is:

1. Adhesive article comprising a foam layer having first and second major sides and a pressure sensitive adhesive layer associated with at least one of the major sides for the foam layer, said pressure sensitive adhesive layer comprising a cross-linked rubber and wherein the foam layer comprises an acrylic polymer obtainable by polymerization of a polymerizable composition comprising one or more alkyl acrylates having an average of 3 to 14 carbon atoms in the alkyl groups, one or more polar monomers and one or more multi-functional monomers having at least two free radical polymerizable groups, a fluoroaliphatic surfactant; and at least 0.20 wt % of a cross linking agent, wherein said polymerizable composition comprises 83 to 97% by weight of said alkyl acrylates, 3 to 16% by weight of said polar monomers and 0.01 to 1% by weight of said multi-functional monomers.

2. Adhesive article according to claim 1 wherein said pressure sensitive adhesive layer comprises an acrylic pressure sensitive adhesive component.

3. Adhesive article according to claim 2 wherein said acrylic pressure sensitive adhesive component comprises an acrylic polymer having repeating units derived from one or more alkyl acrylates having 3 to 14 carbon atoms in the alkyl group and one or more polar monomers.

4. Adhesive article according to claim 1 wherein cross-linked rubber comprises a cross-linked block copolymer having a rubbery block and a glassy block.

5. Adhesive article according to claim 4 wherein said rubbery block comprises a first polymerized conjugated diene, a hydrogenated derivative thereof, or combinations thereof and wherein said glassy block comprises a monovinyl aromatic monomer.

6. Adhesive article according to claim 1 wherein each of said first and second major side of said adhesive article have associated with them said pressure sensitive adhesive layer.

7. Adhesive article according to claim 1 wherein said adhesive article has said pressure sensitive adhesive layer associated with said first major side and wherein said second major side does not have an adhesive layer associated with it.

8. Adhesive article according to claim 1 wherein said adhesive article has said pressure sensitive adhesive layer associated with said first major side and wherein said second major side has a further adhesive layer associated with it.

9. Adhesive article according to claim 8 wherein said further adhesive layer comprises a pressure sensitive adhesive component or a heat activatable adhesive component.

10. Method of making an adhesive article as claimed in claim 1 comprising:
  making a foam layer having first and second major sides by
    (a) providing a polymerizable composition comprising one or more alkyl acrylates having an average of 3 to 14 carbon atoms in the alkyl groups, one or more polar monomers and one or more multi-functional monomers having at least two free radical polymerizable groups and a fluoroaliphatic surfactant, (b) frothing said polymerizable composition and (c) polymerizing said polymerizable composition;
  (ii) applying a pressure sensitive adhesive composition comprising a cross-linkable rubber on one or both of said first and second major sides of said foam layer so as to form a pressure sensitive adhesive layer; and
  (iii) cross-linking said cross-linkable rubber.

11. Method according to claim 10 wherein said cross-linking comprises exposing said cross-linkable rubber to e-beam radiation.

12. Use of an adhesive article according to claim 1 comprising adhering said adhesive article to a substrate through said pressure sensitive adhesive layer.

* * * * *